US006758425B2

(12) United States Patent
Michael

(10) Patent No.: US 6,758,425 B2
(45) Date of Patent: Jul. 6, 2004

(54) COATING-POWDER SPRAY GUN

(75) Inventor: Hanspeter Michael, St. Gallen (CH)

(73) Assignee: ITW Gema AG, St. Gallen (CH)

( * ) Notice: Subject to any disclaimer, the term of this patent is extended or adjusted under 35 U.S.C. 154(b) by 183 days.

(21) Appl. No.: 10/092,607

(22) Filed: Mar. 8, 2002

(65) Prior Publication Data

US 2002/0125349 A1 Sep. 12, 2002

(30) Foreign Application Priority Data

Mar. 9, 2001 (DE) ........................................ 101 11 697

(51) Int. Cl.[7] .......................... B05B 5/00; F23D 11/32; F16L 11/12; F16L 21/00; F16L 55/00

(52) U.S. Cl. .......................... 239/691; 285/53; 285/114

(58) Field of Search ................................ 239/691, 690, 239/706, 707, 600; 138/120, 155, 149; 285/53, 114, 54, 115

(56) References Cited

U.S. PATENT DOCUMENTS

| | | | | |
|---|---|---|---|---|
| 3,048,498 A | * | 8/1962 | Juvinall et al. | 427/484 |
| 3,698,636 A | * | 10/1972 | Szasz | 239/697 |
| 3,794,243 A | * | 2/1974 | Tamny et al. | 239/3 |
| 4,185,783 A | * | 1/1980 | Lacchia | 239/704 |
| 4,196,465 A | | 4/1980 | Buschor | |
| 4,993,645 A | * | 2/1991 | Buschor | 239/708 |
| 4,995,560 A | * | 2/1991 | Lasley et al. | 239/708 |
| 5,022,590 A | * | 6/1991 | Buschor | 239/708 |
| 5,341,989 A | * | 8/1994 | Fulkerson et al. | 239/3 |
| 5,351,903 A | * | 10/1994 | Mazakas et al. | 239/705 |
| 5,413,283 A | * | 5/1995 | Gimple et al. | 239/600 |
| 5,538,189 A | * | 7/1996 | Rodgers | 239/587.5 |
| 5,725,161 A | * | 3/1998 | Hartle | 239/690 |
| 5,759,271 A | * | 6/1998 | Buschor | 118/308 |
| 6,622,948 B1 | * | 9/2003 | Haas et al. | 239/706 |

FOREIGN PATENT DOCUMENTS

| | | |
|---|---|---|
| DE | 28 51 006 C2 | 6/1979 |
| DE | 35 45 885 C1 | 1/1987 |
| DE | 39 04 438 A1 | 8/1990 |
| DE | 198 38 273 A1 | 2/2000 |
| EP | 0 383 031 B1 | 8/1990 |
| EP | 0 611 603 A1 | 8/1994 |
| EP | 0 899 016 A2 | 3/1999 |

OTHER PUBLICATIONS

US 5,857,629, 1/1999, Hartle (withdrawn)
Japanese Patent Abstract No. 06114,298, Date Of Publication Apr. 26, 1994.

* cited by examiner

*Primary Examiner*—Michael Mar
*Assistant Examiner*—Darren Gorman
(74) *Attorney, Agent, or Firm*—Lowe Hauptman Gilman & Berner LLP

(57) ABSTRACT

A high-voltage powder spray gun includes a rear terminal segment (60) of a powder tube (38) and the front terminal segment (58) of a hookup tube (56) which are inserted far enough in axial and sealing manner to subtend, between their overlap ends (69, 78), a powder-tight, electrically insulating expanse (76) to preclude electrical leakage currents. An electrically conducting bush (42) runs over the outer overlap end (78) of the hookup-tube/powder-tube connection to shunt any electric charges that might issue at the outer overlap end (78) between the hookup tube (56) and the powder tube (38). An electrically grounded shielding sheath (90), such as a helical compression spring, is configured radially away above the outer overlap end (88) between the rear terminal segment of the hookup tube (56) and the front end of powder hose (84) slipped over the rear terminal segment. This configuration prevents arcing on the hand of an operator in the event electric charges were to issue between the powder hose (84) and the hookup tube (56).

16 Claims, 2 Drawing Sheets

FIG. 2
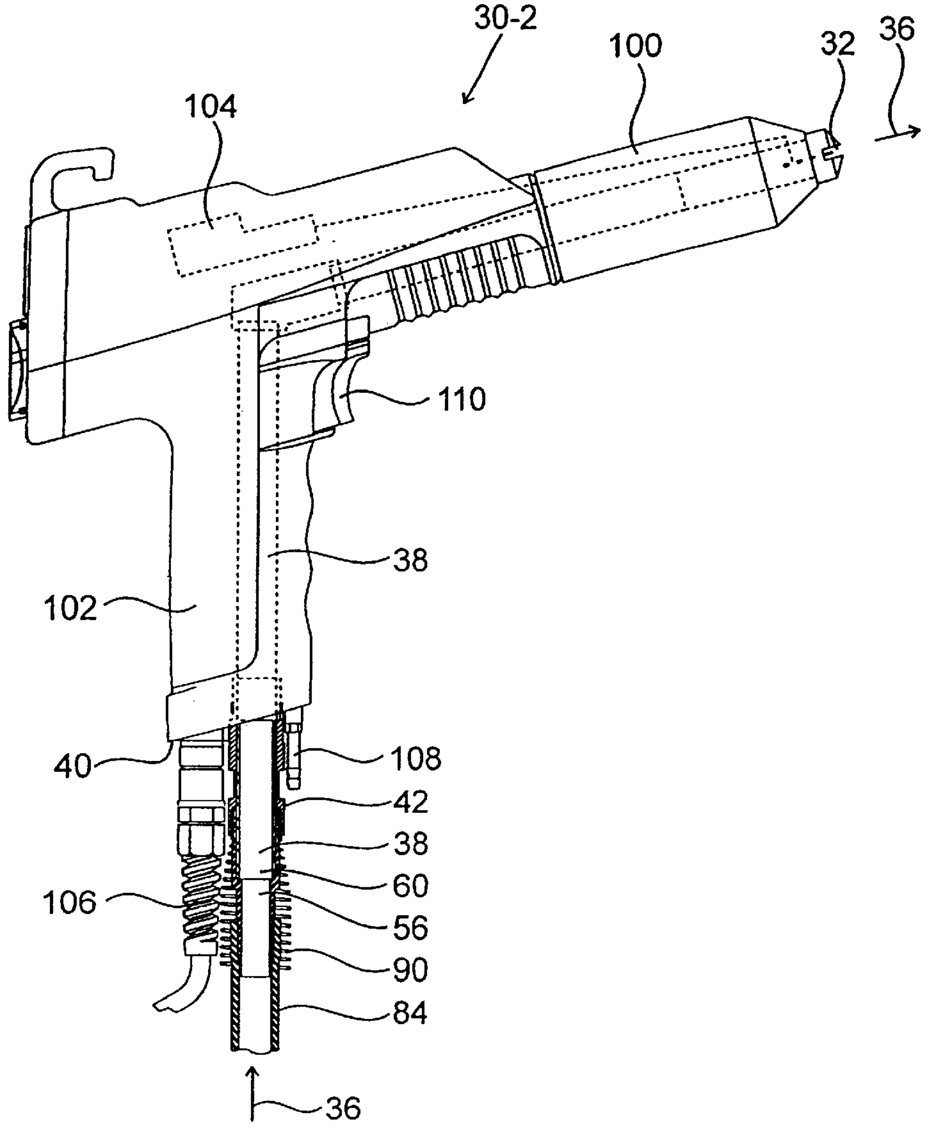
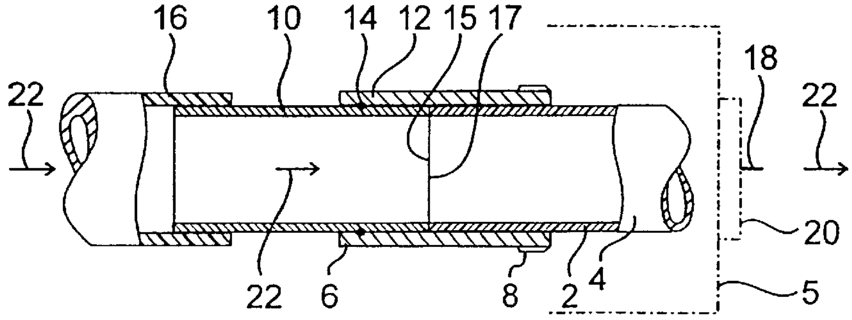
FIG. 3 (PRIOR ART)

COATING-POWDER SPRAY GUN

FIELD OF THE INVENTION

The present invention relates to a coating-powder spray gun.

Accordingly the invention relates to a coating-powder spray gun comprising at least one high-voltage electrode electrostatically charging the powder, a powder tube made of an electrically insulating material situated at an input side in the powder spray-gun, a hookup tube made of an electrically insulating material and of which the front end is connected to the rear end of the powder tube and of which the rear end can be plugged into a powder hose, an electrically conducting bush enclosing and thereby sealing the powder tube and which can be grounded to shunt electrical charges.

BACKGROUND OF THE INVENTION

FIG. 3 of the attached drawings shows a hose/powder-tube hookup of this kind in a known coating-powder spray gun. A bush 6 made of electrically conducting aluminum is slipped onto the rear terminal segment 2 of a powder tube 4 running from the hookup end of a powder spray gun 5 into this gun, and said bush is bonded to the powder tube. The bush is fitted at its front end with an outer thread 8 to allow screwing it into a threaded borehole inside the powder spray gun. A hookup tube 10, or a hookup nipple, is inserted into said bush's rear terminal segment 12 which projects beyond the rear end of the powder tube 4, said tube 10 or nipple being sealed by an O ring 14 with respect to the bush 6. A powder hose 16 can be plugged onto the rear terminal segment of the hookup tube 10 projecting from the bush 6. The bush 6 can be connected to electrical ground. The bush 6 is electrically conducting and is separated for instance by 300 mm from one or more high-voltage electrodes 18 of the powder spray gun 5 which is sketched here in merely schematic manner. This feature meets the operator's electrical-safety requirement (operator exposure to arcing and currents), however in extreme conditions there will be danger of the electrical potential breaking down at the high-voltage electrode 18 if metallic powder (coating powder containing metal powder or metal particles) is used for coating objects. As regards a number of different kinds of metallic powders, the metal particles deposit in unwanted manner on the inside of the powder tube 2, of the hookup tube 10 and of the powder hose 16. These deposited metal particle constitute an electrically conducting layer which may shunt the high voltage between the mutually adjoining end faces 15, 17 of the powder tube 4 and of the hookup tube 10 to the bush 6 and hence to ground. This effect is the more pronounced the closer the high-voltage electrode 18 shall be to the bush 6. The powder flow per se causes the high-voltage breakdown, because said flow is also somewhat conductive. The high-voltage electrode(s) 18 is situated near or inside a mouth 20 of a atomizing nozzle which atomizes the coating powder 22 and sprays it onto an object to be coated.

Similar high-voltage coating-powder spray guns are known from the patent documents U.S. Pat. No. 5,022,590 (EP 0 383 031 B1) and U.S. Pat. No. 4,196,465 (DE 28 51 006 C2).

SUMMARY OF THE INVENTION

The objective of the present invention is to prevent in simple manner the high-voltage breakdown of the minimum of one high-voltage electrode of the powder spray gun even when the coating powder is a metallic powder.

The invention solves this by means of the features of claim 1.

Accordingly a high-voltage powder spraygun of the invention is characterized in that the front terminal segment of the hookup tube and the rear terminal segment of the powder tube are inserted into each other in axially overlapping and airtight manner so that they constitute between themselves an electrically insulated expanse precluding electric currents between their inside and their outside and in that the bush runs axially as far as or beyond the outer overlap end of the hookup-tube/powder-tube connection to shunt any electric charges that might occur in spite of the said insulated expanse at the outer overlap end between the hookup tube and the powder tube.

The dependent claims disclose further features of the invention.

BRIEF DESCRIPTION OF THE DRAWINGS

The invention is elucidated below in relation to the attached drawings and an illustrative embodiment.

FIG. 3 shows a hose/powder-tube hook up on a conventional powder-coating spray gun.

DETAILED DESCRIPTION OF THE INVENTION

Figure 1:
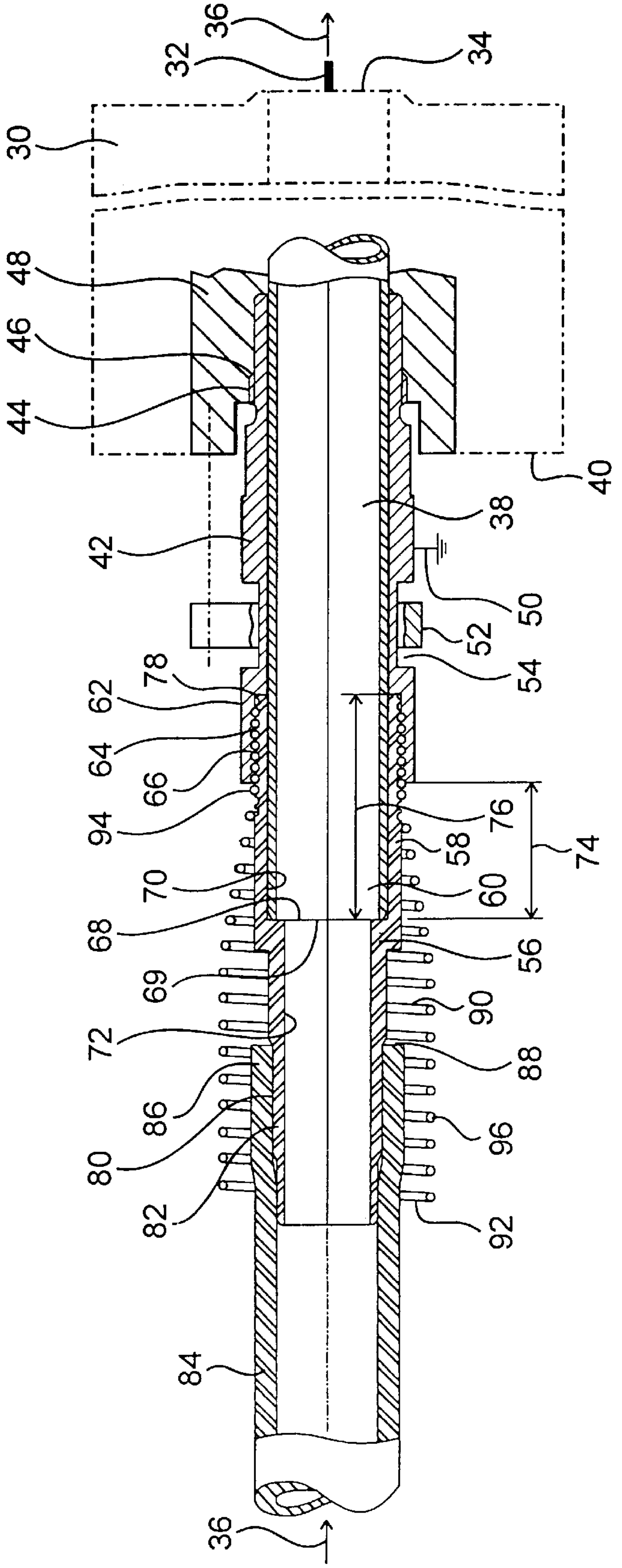
FIG. 1 schematically shows an axial section of powder hookup elements of a high-voltage coating-powder spray gun of the invention, and FIG. 2 schematically shows a sideview of a special embodiment of a powder spray gun of the invention fitted with the hookup elements of FIG. 1.

In the present specification, “front” means downstream with respect to the direction of powder flow and “rear” means upstream. Accordingly, in FIG. 1, “rear” always connotes “left” and in FIG. 2 it always connotes “down”. “Front” in FIG. 1 always means “right” and in FIG. 2 always means “up”.

The high-voltage, coating-powder spray guns of the invention resp. 30 and 30-2 shown in FIGS. 1 and 2, in particular used for metallic powders, (metal powders or in particular powders containing metal particles, for instance plastic powders) are fitted with at least one high-voltage electrode 32 near or in a spray aperture 34 for the purpose of electrostatically charging coating powders 36. The coating powder 36 flows inside the powder spray gun at least in its initial segment through a powder tube 38 made of an electrically insulating material and projecting from a gun intake side 40. A (thread-in) bush 42 made of an electrically conducting material such as aluminum is hermetically plugged onto the powder tube 38 and is adhesively bonded at its inner periphery to the outer periphery of the powder tube 38. The metallic bush 42 is fitted at its terminal segment with an outer thread 44 by means of which it is screwed into an inside thread 46 of a seat 48 for the powder spraygun 30.

The electrically conducting bush 42 can be grounded (50) for instance using a grounding bolt or a metal clasp 52 pivotably mounted on the seat 48 and allowing being pivoted into or out of an external, peripheral groove 54.

A hookup tube 56 and the powder tube 38 are inserted into each other, preferably by plugging. The hookup tube 56 or hookup nipple is made of an electrically insulting material such as plastic and comprises a front tube segment 58 which is plugged hermetically onto a rear terminal segment 60 of the powder tube 38. The front tube segment 58 of the hookup tube 56 projects axially forward into an annular space constituted between the powder tube 38 and a diametrically widened rear terminal segment 62 of the bush 42 and therein is axially and radially connected to the bush 42. For that purpose the front terminal segment 58 of the hookup tube 56 may be fitted with an outside thread 64 which is screwed into an inside thread 66 of the bush 42. Another affixation procedure would resort to bonding or to snap-in connections.

The rear terminal segment 60 of the powder tube 38 projects axially to the rear and out of the bush 42. The rear powder-tube end 69 is seated on an annular offset 68 constituted in the hookup tube 56 between a front borehole segment 70 of relative large diameter and receiving the powder tube 38 and a rear borehole segment 72 of relatively small diameter of the hookup tube 56.

The powder tube 38 projects rearward by a stub length 74 beyond the rear end of the electrically conducting bush 42. The rear powder tube end 69 of the electrically insulating powder tube 38 and the front end 78 of the hookup tube 56 also made of an electrically insulating material overlap axially to subtend a sufficiently long insulating expanse 76 which prevents electrical charges draining out of the powder tube 38 toward the electrically conducting and grounded bush 50. The bush 42 runs axially beyond the outer overlap end 78 (front hookup tube end 78) of the hookup-tube/powder-tube connection in order to receive and drain any electrical charges that might leak out—in spite of the long, electrically insulating expanse 76—at the outer overlap end 78 between the hookup tube 56 and the powder tube 38.

Because, (contrary to the situation of the state of the art), the electrical high-voltage charges at the boundary between the powder tube 38 and the hookup tube 56 no longer can drain to ground 50 the high voltage from the high-voltage electrode 32 may run through the powder path as far as into the powder hose 84 used for powder feed, said hose being plugged onto the cross-sectionally contoured outer periphery 80 of the terminal segment 82 of the hookup tube 56. The powder hose is made of an electrically insulating material. If the powder hose 84 is not plugged deep enough onto the hookup tube 56, or if electrically conducting coating powder finds its way between the hookup tube 56 and the powder hose 84, sparkover and the like may take place between the powder hose 84 and the hookup tube 56 onto the operator's hand if this hand should be in the vicinity of the front hose end 86. Therefore the invention provides in advantageous manner that the critical region situated beyond the overlap end 88 between the front hose end 86 and the hookup tube 56 shall be enclosed by a shielding sheath 90 configured at a safe radial distance to prevent arcing, said shielding sheath being electrically conductive and furthermore being electrically connected at its front end to the bush 42 which may be grounded at 50. Preferably the electrically conducting shielding sheath 90 shall be resiliently compressible in order that, when plugging the powder hose 84 onto the hookup tube 56, the rear end 92 of the shielding sheath 90 shall be displaceable forward toward the bush 42 at least by the length by which the powder tube 84 must be plugged onto the hookup tube 56.

Preferably the front terminal segment 94 of the shielding sheath 90 is inserted, in particular it will be clamped, between the outside periphery of the hookup tube 56 and the rear terminal segment 62 of the bush 42, said terminal segment overlapping said tube. In the process, the front terminal segment 94 of the shielding sheath 90 may enter the turns of the threads 64 and 66 of these two components. These components also may be bonded to each other in this region. The front terminal segment 94 of the shielding sheath 90 exhibits a diameter which is reduced to the outside diameter of the front terminal segment 58 of the hookup tube 56, whereas its rear terminal segment 96 exhibits a larger inside diameter at least at the overlap end 88 of the plug-in hookup-tube/powder-hose connection. As shown in FIG. 1, the shielding sheath 90 preferably shall be a helical compression spring.

The high-voltage, coating-powder spray gun 30 schematically shown in FIG. 1 may assume overall a "pistol" shape or be elongated, the powder tube 38 axially projecting from the rear, spray-gun intake side.

As shown in FIG. 2, the high-voltage powder spray gun 30-2 also may be in the shape of a "pistol" barrel 100 fitted with a downward projecting spray gun grip 102 at the lower end of which—when this is the spray gun intake side 40—projects the rear terminal segment 60 of the powder tube 38. The same references are used for elements in FIG. 2 which correspond to those of FIG. 1 and therefore shall not be described again. FIG. 2 additionally shows that instead of being provided from the outside, the high voltage for the high-voltage electrode 32 of the powder spray gun 30-2 also can be provided from an integrated high-voltage source 104 which may be applied from a low voltage source through a cable 106. The cable 106 furthermore may contain an electric hookup line to ground the bush 42 (namely in the form of a preferably aluminum element which shall be screwed into the gun). This embodiment also may be fitted with a compressed-air adapter 108 to feed compressed air to the high-voltage electrode 32 and with a trigger 110 to manually turn spray gun operation ON and OFF.

What is claimed is:

1. A coating-powder spray gun, comprising:

at least one high-voltage electrode (32) for electrostatically charging coating powder;

a powder tube (38) made of electrically insulating material, positioned at an intake side of the spray gun, and having a rear terminal segment;

a hookup tube (56) made of electrically insulating material and having a front terminal segment and a rear terminal segment which is adapted to be connected to a powder supply hose (84); and a bush (42) made of electrically conducting material, enclosing the powder tube (38) in sealing manner, and connectable to electrical ground to shunt electrical charges;

wherein the front terminal segment (58) of the hookup tube (56) and the rear terminal segment (60) of the powder tube (38) are axially inserted into each other in overlapping and airtight manner so as to define an electrically insulating overlapping tube portion;

said overlapping tube portion has a first end defined by the front terminal segment (58) of the hookup tube (56) and a second, opposite end defined by the rear terminal segment (60) of the powder tube (38), one of said first and second ends of said overlapping tube portion being positioned radially outwardly with respect to the other and defining an outer overlap end (78); and the bush (42) extends axially and rearwardly as far as or beyond the outer overlap end (78) for shunting any electrical charges that might issue at the outer overlap end (78).

2. The spray gun as claimed in claim 1, wherein the rear terminal segment (60) of the powder tube (38) is inserted into the front terminal segment (58) of the hookup tube (56).

3. The spray gun as claimed in claim 2, wherein the hookup tube (56) comprises a front borehole segment (70) and an adjoining rear borehole segment (72);

a diameter of the front borehole segment (70) is larger than that of the adjoining rear borehole segment (72), whereby an offset (68) is defined between said front and rear borehole segments (70, 72); and the rear terminal segment (60) of the powder tube (38) is inserted into the front borehole segment of the hookup tube (56) and rests on said offset (68).

4. A spray gun, comprising:

a high voltage electrode for electrostatically charging coating powder;

a powder tube made of electrically insulating material, positioned at an intake side of the spray gun, and having a rear terminal segment;

a hookup tube made of electrically insulating material and having a front terminal segment and a rear terminal segment which is connected to a powder supply hose; and a bush made of electrically conducting material, enclosing the powder tube in sealing manner, and connectable to electrical ground to shunt electrical charges;

wherein the front terminal segment of the hookup tube and the rear terminal segment of the powder tube are axially inserted into each other in overlapping and airtight manner so as to define a first electrically insulating overlapping tube portion;

the rear terminal segment of the hookup tube and the powder supply hose are axially inserted into each other so as to define a second overlapping tube portion, one of the rear terminal segment of the hookup tube and the powder supply hose having an end that defines an outer overlap end of said second overlapping tube portion;

said gun further comprises an electrically conducting shielding sheath which encloses the outer overlap end of said second overlapping tube portion and is radially spaced therefrom by an air gap, said air gap being configured to prevent electric arcing between said outer overlap end of said second overlapping tube portion and the shielding sheath; and said electrically conducting shielding sheath is electrically connected to the bush.

5. The spray gun as claimed in claim 4, wherein the shielding sheath is affixed to the bush.

6. The spray gun as claimed in claim 5, wherein a front terminal segment of the shielding sheath is inserted into an annular space between the bush and the hookup tube and is held in place axially and radially therein by the bush and the hookup tube.

7. The spray gun as claimed in claim 4, wherein the shielding sheath has a front terminal segment and a rear terminal segment, the front terminal segment of the shielding sheath having a diameter smaller than the rear terminal segment which is radially, outwardly spaced from the outer overlap end of said second overlapping tube portion constituted between the hookup tube and the powder supply hose.

8. The spray gun as claimed in claim 4, wherein the shielding sheath is a helical spring having turns that enclose the hookup tube.

9. The spray gun as claimed in claim 4, wherein the shielding sheath is resiliently axially compressible.

10. The spray gun as claimed in claim 1, wherein at least one of the junctions (a) of the powder tube (38) and the bush (42) and (b) of the powder tube (38) and the hookup tube (56) represents a plug-in connection.

11. The spray gun as claimed in claim 10, wherein said plug-in connection contains adhesive and is an adhesive connection.

12. A spray coating gun, comprising:

a high voltage electrode for electrostatically charging a coating substance;

a first tube for delivering the coating substance to said high voltage electrode, said first tube being made of electrically insulating material and having a rear terminal segment;

a second tube made of electrically insulating material and having a front terminal segment and a rear terminal segment which is connectable to a supply hose; and a bush made of electrically conducting material, enclosing the first tube in sealing manner, and connectable to electrical ground;

wherein the front terminal segment of the second tube and the rear terminal segment of the first tube are axially inserted into each other in overlapping and airtight manner so as to define an electrically insulating overlapping tube portion; and the second tube and the bush have matching threads and are joined together by said threads.

13. The spray gun as claimed in claim 1, wherein the rear terminal segment (82) of the hookup tube (56) has a cross-sectionally contoured outer surface (80) onto which the powder hose (84) is plugged.

14. The gun as claimed in claim 1, wherein the hookup tube and the bush have matching threads and are joined together by said threads.

15. The gun as claimed in claim 4, wherein one of the front terminal segment of the hookup tube and the rear terminal segment of the powder tube having an end that defines an outer overlap end of said first overlapping tube portion; and the bush covers the outer overlap end of said first overlapping tube portion for shunting any electrical charges that might issue at said outer overlap end.

16. The gun as claimed in claim 12, further comprising an electrically conducting shielding sheath being fastened between the second tube and the bush, and extending rearwardly to enclose at least a portion of the rear terminal segment of the second tube where the supply hose is to be connected.

* * * * *